(12) United States Patent
Focke et al.

(10) Patent No.: US 6,325,591 B1
(45) Date of Patent: Dec. 4, 2001

(54) DEVICE FOR HANDLING OBJECTS

(75) Inventors: Heinz Focke, Verden; Hanfried Kerle, Braunschweig; Wolfgang Gropp, Daverden, all of (DE)

(73) Assignee: Focke & Co. (GmbH & Co.), Verden (DE)

( * ) Notice: Subject to any disclaimer, the term of this patent is extended or adjusted under 35 U.S.C. 154(b) by 0 days.

(21) Appl. No.: 09/331,707

(22) PCT Filed: Dec. 20, 1997

(86) PCT No.: PCT/EP97/07222

§ 371 Date: Aug. 12, 1999

§ 102(e) Date: Aug. 12, 1999

(87) PCT Pub. No.: WO98/28190

PCT Pub. Date: Jul. 2, 1998

(30) Foreign Application Priority Data

Dec. 23, 1996 (DE) .............................. 196 54 041

(51) Int. Cl.[7] .................................. B66F 19/00
(52) U.S. Cl. ................... 414/749.1; 414/749.6; 414/751; 414/752; 414/719; 414/713
(58) Field of Search .............. 414/749.1, 751, 414/749.6, 752.1, 719, 713, 707, 682, 917, 22, 746.8

(56) References Cited

U.S. PATENT DOCUMENTS

| | | | |
|---|---|---|---|
| 3,174,789 | 3/1965 | Scherr | 294/64 |
| 4,177,002 * | 12/1979 | Motoda et al. | 414/751 |
| 4,315,437 | 2/1982 | Etcheparre et al. | 74/89.22 |
| 4,345,864 * | 8/1982 | Smith, Jr. et al. | 414/22 |
| 4,400,985 * | 8/1983 | Bond | 74/103 |
| 4,543,033 * | 9/1985 | Czermak et al. | 414/732 |
| 4,563,788 * | 1/1986 | Kobayashi | 15/312 |
| 4,585,389 * | 4/1986 | Watanabe et al. | 414/752 |
| 4,634,338 * | 1/1987 | Tsuge et al. | 414/752 |
| 4,637,243 * | 1/1987 | Bond | 72/421 |
| 4,756,662 * | 7/1988 | Tanie et al. | 414/729 |
| 4,761,112 * | 8/1988 | Hammon et al. | 414/591 |
| 5,056,299 | 10/1991 | Furukawa et al. | 53/571 |
| 5,218,876 * | 6/1993 | Lindsay | 74/96 |
| 5,222,854 * | 6/1993 | Blatt et al. | 414/225 |
| 5,423,648 * | 6/1995 | Akeel et al. | 414/225 |
| 5,452,981 * | 9/1995 | Crorey et al. | 414/225 |
| 5,890,396 * | 4/1999 | Kaneko et al. | 74/490.1 |
| 6,095,011 * | 8/2000 | Brogarth | 74/490.3 |
| 6,105,909 * | 8/2000 | Wirth et al. | 248/123.2 |
| 6,106,511 * | 8/2000 | Jensen | 606/1 |

FOREIGN PATENT DOCUMENTS

| | | |
|---|---|---|
| 897194A | 1/1984 | (BE) . |
| 1611845 | 1/1968 | (DE) . |
| 1900556A | 8/1970 | (DE) . |
| 2634754B1 | 12/1977 | (DE) . |
| 3400822A1 | 7/1985 | (DE) . |
| 19525482A1 | 1/1997 | (DE) . |
| 08025256A | 1/1990 | (JP) . |
| 187715A | 7/1996 | (JP) . |

* cited by examiner

*Primary Examiner*—Joseph A. Fischetti
(74) *Attorney, Agent, or Firm*—Abelman, Frayne & Schwab

(57) ABSTRACT

The disclosure relates to a device for handling objects to package the same. The handling device comprises a lifting head (17) placed in an extension arm (16) having multiple levers (59, 60, 61), with ends (62, 67) placed on linear drives (63, 68) that can be independently controlled and are flexibly interconnected to the opposite ends (65, 69). The displacement of the linear drives (63, 68) makes it possible to move back and forth the ends (62, 67) of the levers (59, 60, 61) that are flexibly connected to the linear drives (63, 68), thereby enabling the ends (62, 65, 67, 69) of the levers (59, 60, 61) to pivot. These pivotal movements allow the lifting head (17) that is placed on the extension arm (16) to move up and down in a vertical direction and back and forth in a horizontal direction.

10 Claims, 9 Drawing Sheets

DEVICE FOR HANDLING OBJECTS

The invention relates to an apparatus for handling articles in conjunction with the packaging of the same, having a receiving head which is arranged on an extension arm and is intended for receiving at least one article from a supply plane, in particular from a feed conveyor, and for transferring the article to a receiving plane, in particular to a pack which is positioned on a removal conveyor and is intended for the article.

The apparatus of the type mentioned in the introduction serves for handling, for example, chocolates, coffee bags or the like. The articles, which are supplied on the feed conveyor, are to be received, and transferred to a pack for the articles, with the aid of the apparatus. The handling of the articles is to take place automatically—that is to say exclusively mechanically.

The problem on which the invention is based is thus to propose an apparatus which is suitable for grasping articles and for transferring the same to a receiving plane for packaging purposes.

In order to solve this problem, the apparatus according to the invention is characterized in that the extension arm comprises levers which are mounted on linear drives by way of ends or are connected in an articulated manner to one another by way of ends, it being the case that those ends of the levers which are mounted on the linear drives can be displaced by at least two independently controllable linear drives such that at least those ends of the levers which are connected in an articulated manner to one another can be pivoted and, by virtue of these pivoting movements, the receiving head, which is provided on the extension arm, can be raised and lowered in the vertical direction and moved back and forth in the horizontal direction.

The apparatus which is designed in the above manner has a small, straightforward construction. With the aid of the linear drives, the receiving head can be displaced quickly. Accordingly, the apparatus according to the invention is suitable for high operating speeds. Furthermore, with the aid of an apparatus of this type, the receiving head can be displaced to any desired position in space.

The linear drives are preferably fastened on a closed frame, which is arranged above the feed conveyor and removal conveyor, such that carriages of the linear drives can be moved back and forth transversely to the conveying direction of the feed conveyor and removal conveyor. The frame rests on vertical supports which run laterally alongside the feed conveyor and removal conveyor. Accordingly, by way of an apparatus configured in this way, the receiving head can be displaced out of a position above the feed conveyor into a position above the removal conveyor.

According to an advantageous development of the invention, the extension arm comprises two parallel levers, mounted in an articulated manner at their ends in each case, and at least one further lever, arranged at an angle to the parallel levers. In this case, the parallel levers are fastened in an articulated manner, on the one hand, on a common carriage and, on the other hand, on the receiving head. The further lever is connected in an articulated manner to a second, independently controllable carriage and the receiving head. An apparatus configured in this way ensures, by particularly straightforward design means, that the receiving head can be displaced as desired.

BRIEF DESCRIPTION OF THE DRAWINGS

Preferred developments of the invention can be gathered from the subclaims and the description. Exemplary embodiments of the invention will be explained in more detail with reference to the drawing, in which:

Figure 1:
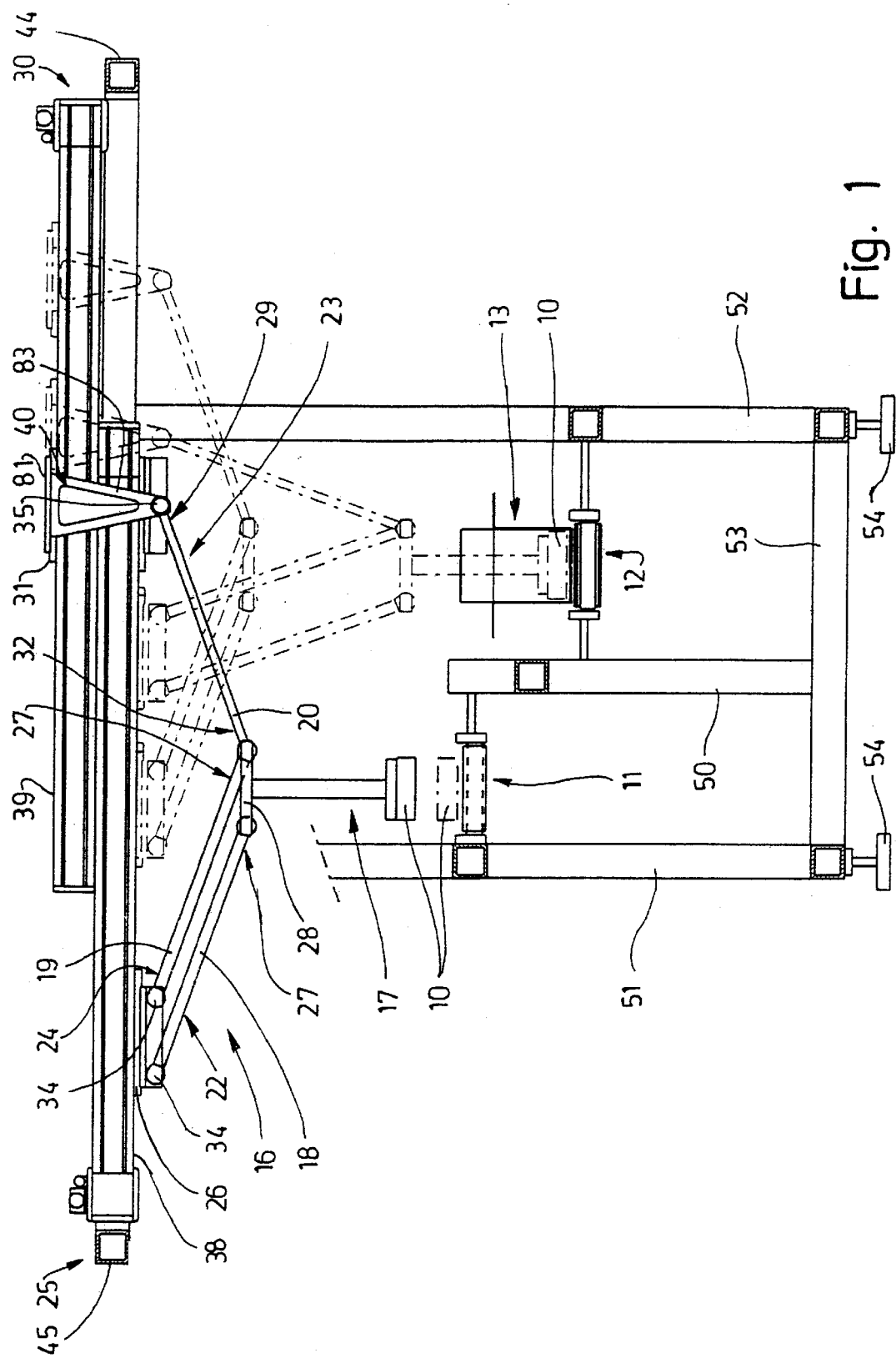
FIG. 1 shows a front view of an apparatus according to the invention for handling articles according to a first exemplary embodiment of the invention.
Figure 2:
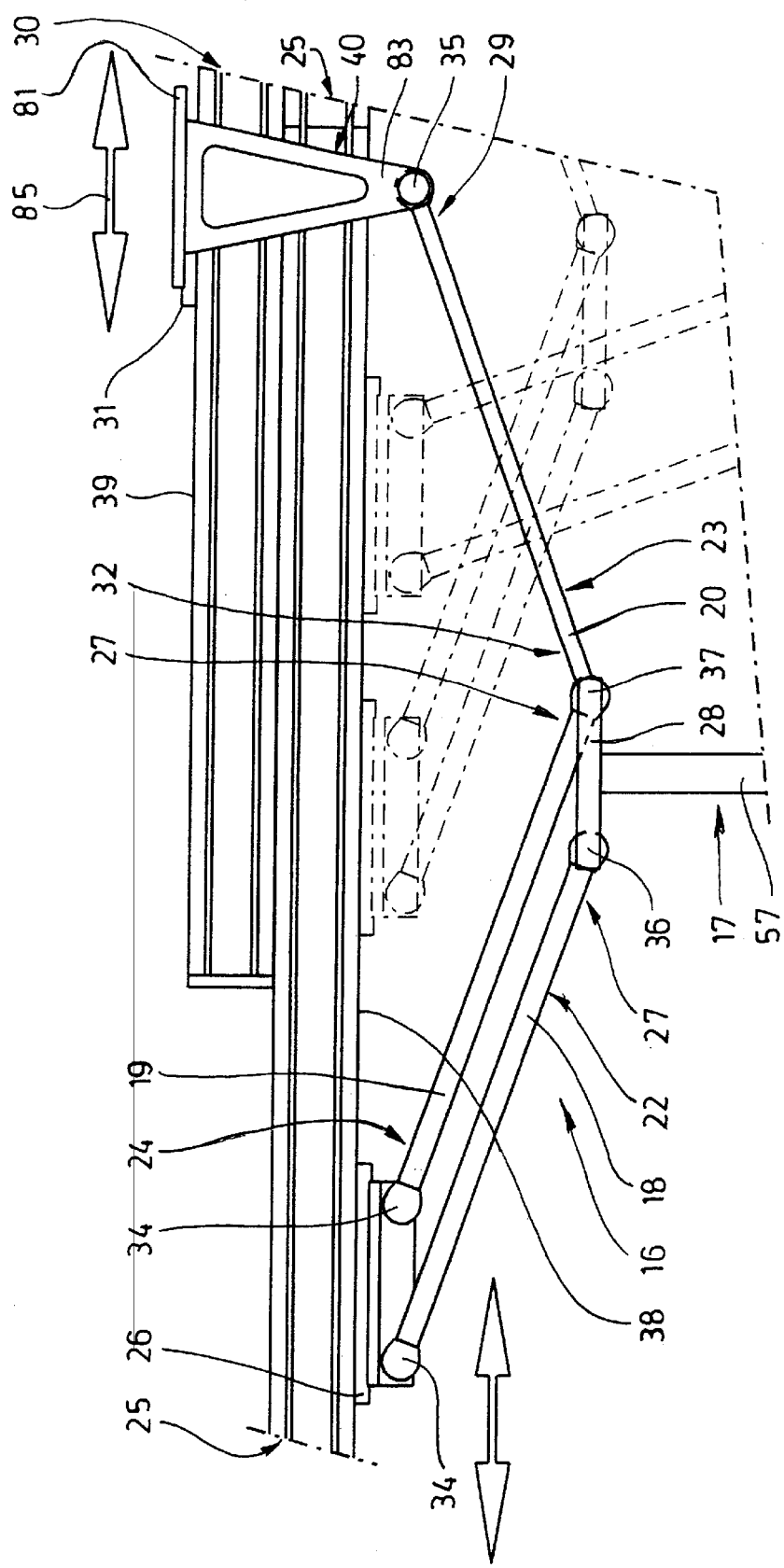
FIG. 2 shows, in a view analogous to FIG. 1, a detail of the apparatus according to FIG. 1 in the region of linear drives.

The exemplary embodiments of the apparatus according to the invention which are shown in the drawing relate to the preferred application area of the same, namely to the handling of articles supplied on a feed conveyor. The apparatus according to the invention grasps the articles, lifts them off from the feed conveyor and transports them in the direction of a removal conveyor. The articles are then transferred to a pack which is positioned on the removal conveyor and is intended for the article. The articles are, for example, chocolates or the like.

The articles 10 which are to be handled are supplied by a feed conveyor 11 and transferred to a removal conveyor 12 with the aid of the apparatus according to the invention. The feed conveyor 11 is also referred to as a product belt, and the removal conveyor 12 is also referred to as a box belt. A pack 13 which is open at the top and is intended for the articles 10 which are to be handled is positioned on the removal conveyor 12. Once the articles 10 have been transferred to the pack 13, the latter is transported to a closing station (not shown) for the pack 13.

The feed conveyor 11 and removal conveyor 12 are arranged one beside the other and in a vertically offset manner in relation to one another. Conveying directions of the feed conveyor 11 and removal conveyor 12, which are illustrated by arrows 14, 15 in FIGS. 3, 4 and 7, 8, run parallel to one another. Accordingly, the apparatus according to the invention fulfils the task of transporting the articles 10 transversely to the conveying directions of the feed conveyor 11 and removal conveyor 12. The feed conveyor 11 and removal conveyor 12 are designed as belt conveyors.

A receiving head 17, which is arranged on an extension arm 16, serves for receiving the articles 10 from the feed conveyor 11 and transporting them in the direction of the removal conveyor 12. Details regarding the configuration and mounting of the extension arm 16 and/or receiving head 17 will be illustrated separately hereinbelow for the two exemplary embodiments.

In the case of the exemplary embodiment according to FIGS. 1 to 5, the extension arm 16 comprises a plurality of links or levers. The levers are rectilinear rods. Specifically, the apparatus according to FIGS. 1 to 5 has four links or levers 18, 19, 20, 21. In each case two levers 18, 19 and 20, 21 form a pair 22, 23 of levers which run parallel to one another. The parallel levers 18, 19 of the first pair 22 are fastened in an articulated manner on a linear drive 25, namely a carriage 26 of the linear drive 25, by way of a first end 24. By way of a second end 27, which is located opposite the end 24, the levers 18, 19 of the pair 22 are connected, on the one hand, in an articulated manner to one another via a plate 28 and to the receiving head 17 via the plate 28. The levers 20, 21 of the second pair 23, for their part, are connected, by way of ends 29, to a second linear drive 30, namely to a carriage 31 of the same, it being possible for said second linear drive to be controlled independently of the first linear drive 25. By way of the ends 32, which are located opposite the ends 29, the levers 20, 21 of the pair 23, in turn, are connected, on the one hand, in an articulated manner to one another and, on the other hand, to the receiving head 17. The plate 28 serves for connecting the levers 20, 21. In addition to the levers 20, 21 of the pair 23, the levers 18, 19 of the,pair 22 also act on the plate 28. Accordingly, the levers 18, 19 and 20, 21 of the pairs 22, 23, respectively, are connected to one another and to the receiving head 17 at the ends 27, 32.

Accordingly, the abovedescribed extension arm 16 has a multiplicity of articulations. Two first articulations 34 fasten the ends 24 of the levers 18, 19 of the pair 22 on the carriage 26 of the linear drive 25. Accordingly, the ends 29 of the levers 20, 21 are fastened, by way of an articulation 35 in each case, on the carriage 31 of the second, independently controllable linear drive 30. In this case, the articulations 34, 35, which are assigned to the linear drives 25, 30, are located in one plane. By way of the ends 27 and 32, which are respectively located opposite the ends 24 and 29, the levers 18, 19 and 20, 21, respectively, are connected to one another and to the receiving head 17 via articulations 36, 37. In addition, the articulations 36, 37, which are assigned to the receiving head 17, are located in one plane. The articulations 37, which are assigned to the ends 32 of the levers 20, 21, and the articulation 36 which is assigned to the end 27 of the lever 19 act on the same side 33 of the plate 28. In contrast, the articulation 36 which is assigned to the end 27 of the lever 18 is spaced apart from the side 33 and assigned to an opposite side of the plate 28. Also of importance is the fact that the articulations 36, 37 are arranged symmetrically in relation to a longitudinal centre axis of the receiving head 17. Accordingly, the articulations 37 of the levers 20, 21 are positioned at the same spacings in relation to the longitudinal centre axis of the receiving head 17. Likewise, the articulations 36 of the levers 18, 19 are at the same spacings in relation to the longitudinal centre axis of the receiving head 17. This ensures that the receiving head is subjected to force exclusively in the direction of its longitudinal centre axis. Accordingly, a total of eight articulations 34..37 are provided.

The respectively parallel levers 18, 19 and 20, 21 of each pair 22, 23 are located in one plane. The levers 18, 19 are located in the drawing plane of FIGS. 1 and 2 and the levers 20, 21 are located in the drawing plane of FIGS. 4 and 5. As can be seen from FIGS. 1 and 2, these planes enclose an angle. Furthermore, according to FIG. 5. the levers 20, 21 are mounted in the plate 28 adjacent to the sides 33.

The linear drives 25, 30 are arranged in vertically offset planes, namely directly one above the other. The linear drives 25, 30 are connected to one another in a region in which they overlap. Furthermore, the linear drives 25, 30 are positioned in a manner in which they are offset through 180° in relation to one another. Accordingly, the carriage 26 of the linear drive 25 is arranged on an underside 38 of the linear drive 25 and, in contrast, the carriage 31 of the linear drive 30 is arranged on a top side 39 of the linear drive 30. The levers 20, 21 of the pair 23 are connected to the carriage 31 of the linear drive 30 via a lateral, downwardly directed carrying element 40. The articulations 35 are assigned to the carrying element 40. According to FIG. 5, the carrying element 40 is of cross-sectional U-shaped design with a base leg 81 running above the carriage 31 and with two downwardly directed legs 82, 83. The legs 82, 83 are of triangular outline. The articulations 35 are assigned to a bottom vertex of the legs 82, 83.

By virtue of a movement of the carriages 26, 31 of the independently moveable and controllable linear drives 25, 30, the receiving head 17, which is positioned on the extension arm 16, can be displaced as desired in space. FIG. 1 shows the extension arm 16 and the receiving head 17 in different positions. In a first position, which is illustrated by solid lines in FIG. 1, the receiving head 17 is positioned above the feed conveyor 11. By virtue of the carriages 26, 31 of the linear drives 25, 30 being displaced in the same direction, with the spacing of the carriages 26, 31 relative to one another being maintained, the receiving head can be moved back and forth in the horizontal direction. By virtue of the carriages 26, 31 being displaced relative to one another, that is to say by virtue of the spacing of the carriages 26, 31 relative to one another being changed, the receiving head 17 can be raised and lowered in a vertical direction, that is to say, by virtue of the spacing of the carriages 26, 31 relative to one another being changed, the levers 18, 21 are pivoted. On the one hand, this causes the angle which is enclosed by the levers 18, 19 and 20, 21 to be changed and, on the other hand, the spacing between the levers 18, 19 changes, while the spacing between the levers 20, 21 remains unchanged. Accordingly, the levers 18, 19 form a parallelogram linkage. This causes the receiving head 17 to be raised or lowered. By way of chain-dotted lines, FIG. 1 shows the receiving head 17 in a position above the removal conveyor 12, this position being lower than the position of the receiving head 17 above the feed conveyor 11. This is achieved in that the relative spacing between the carriages 26, 31 is reduced. By virtue of a corresponding increase in the spacing of the carriages 26, 31 relative to one another, the receiving head can be raised correspondingly. Of course, it is possible to superimpose the abovedescribed movements of the receiving head 17 in the horizontal and vertical directions. This can be achieved, inter alia, in that the carriages 26, 31 of the linear drives 25, 30 are displaced at different speeds in the same direction. This automatically changes the spacing of the carriages 26, 31 relative to one another as they are simultaneously moved in the horizontal direction.

The vertically offset arrangement of the feed conveyor 11 and removal conveyor 12 is also of importance in this context. This is because the downwardly offset arrangement of the removal conveyor 12 in relation to the feed conveyor 11 makes shorter, and thus quicker, displacements of the receiving head 17 possible.

Figure 3:
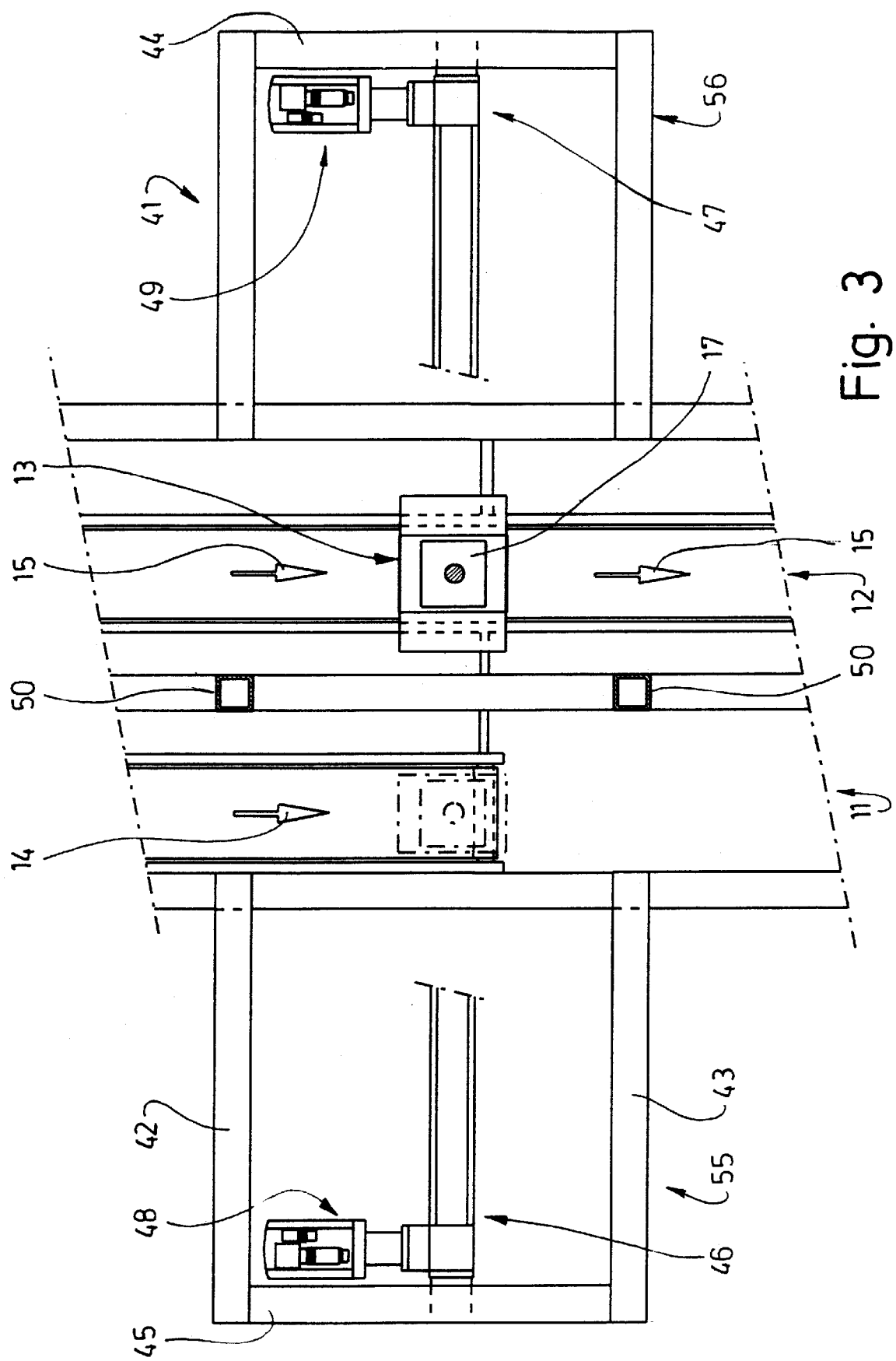
FIG. 3 shows a plan view of the apparatus according to FIG. 1.
Figure 4:
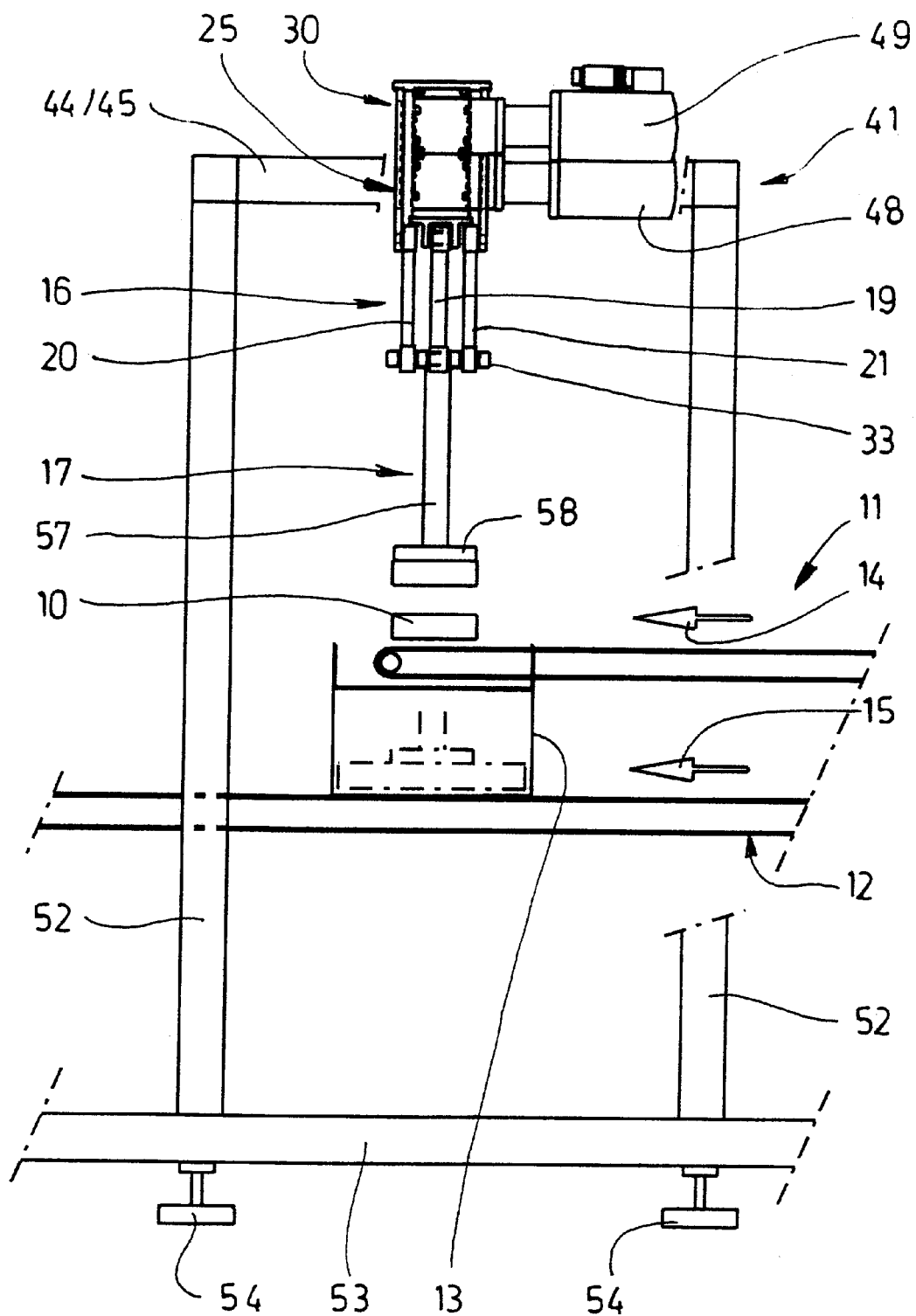
FIG. 4 shows a side view of the apparatus according to FIGS. 1 to 3.
Figure 5:
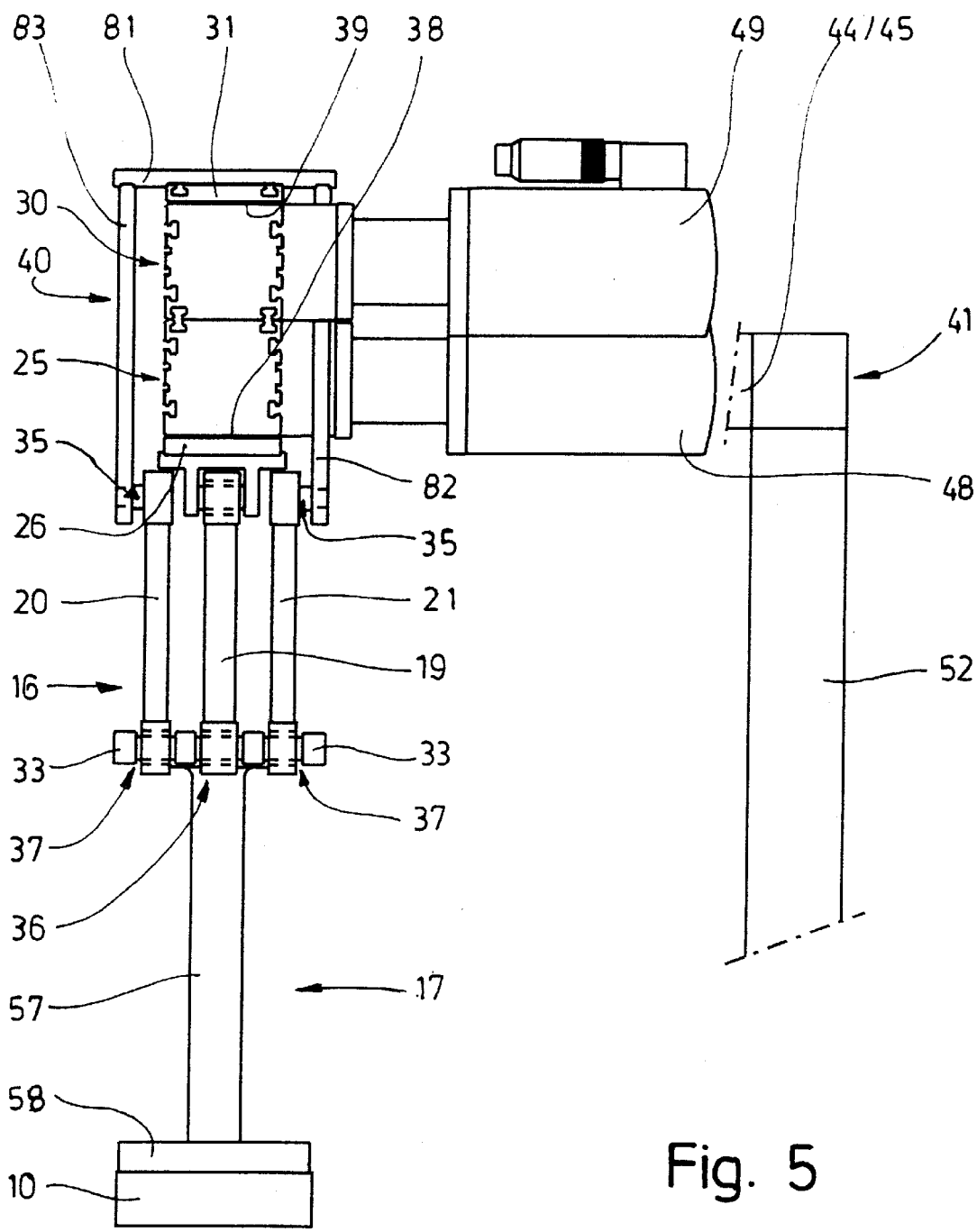
FIG. 5 shows, in a view analogous to FIG. 4, a detail of the apparatus according to FIGS. 1 to 4 in the region of the linear drives.
Figure 6:
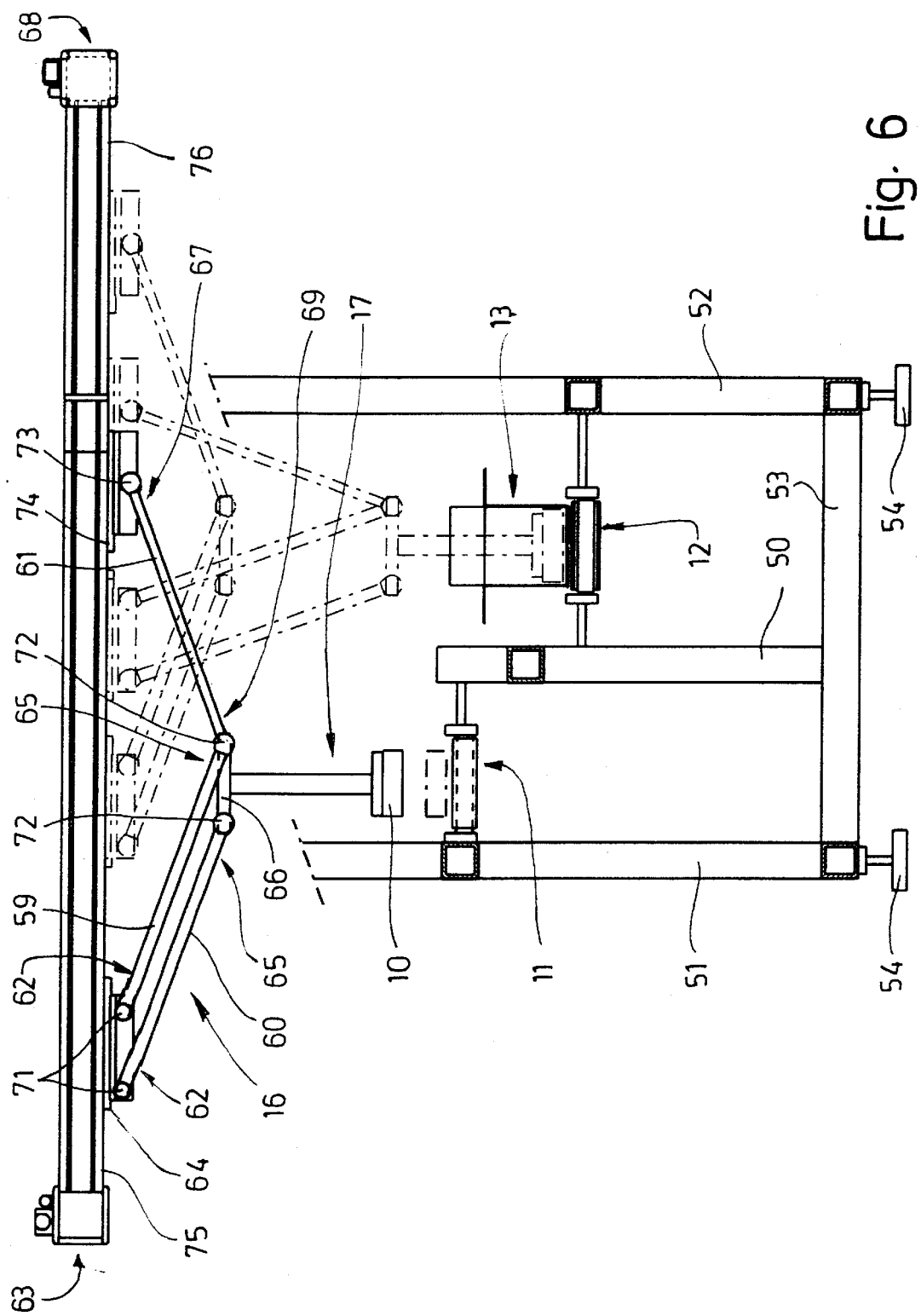
FIG. 6 shows a front view of an apparatus for handling articles according to a second exemplary embodiment of the invention.
Figure 7:
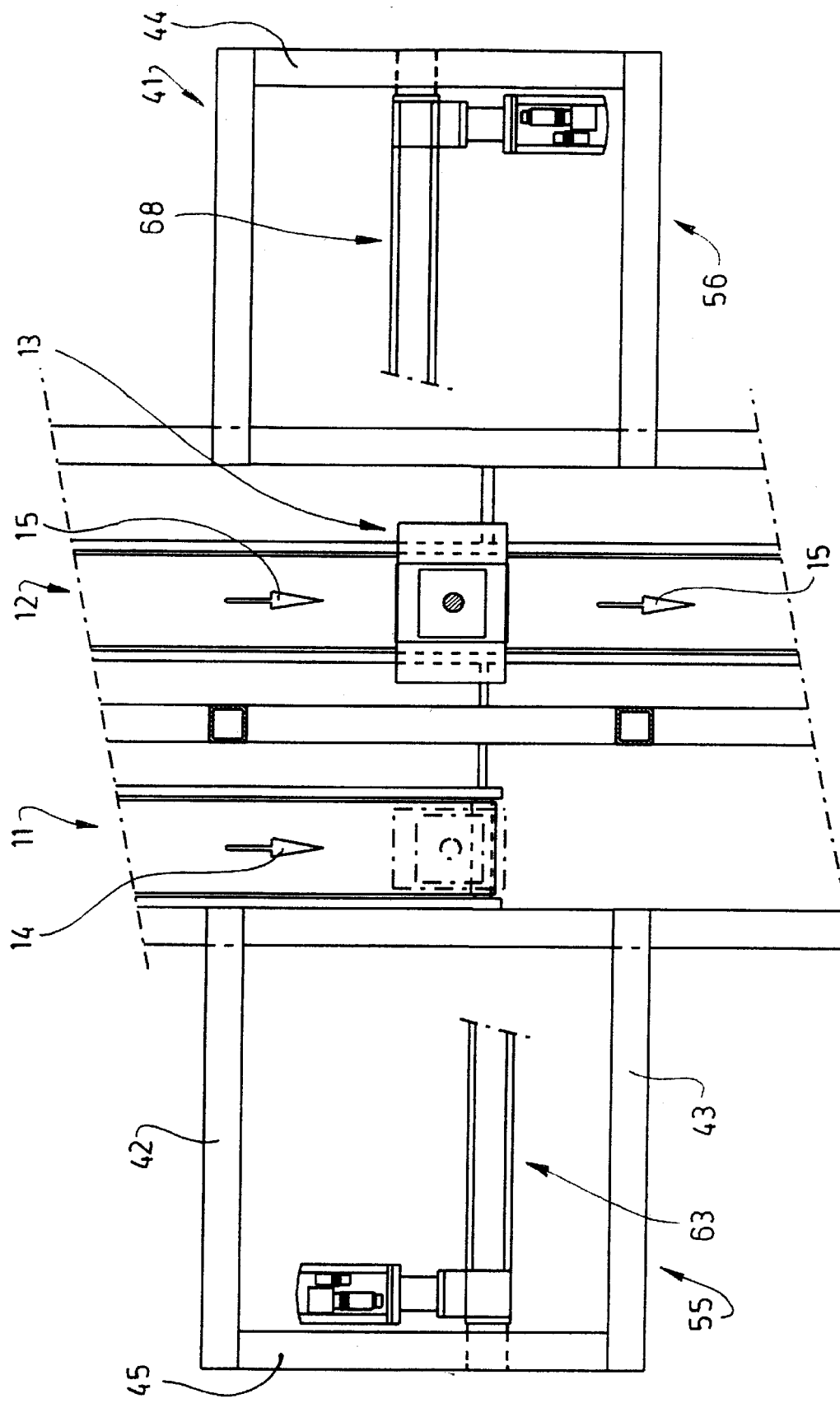
FIG. 7 shows a plan view of the apparatus according to FIG. 6.
Figure 8:
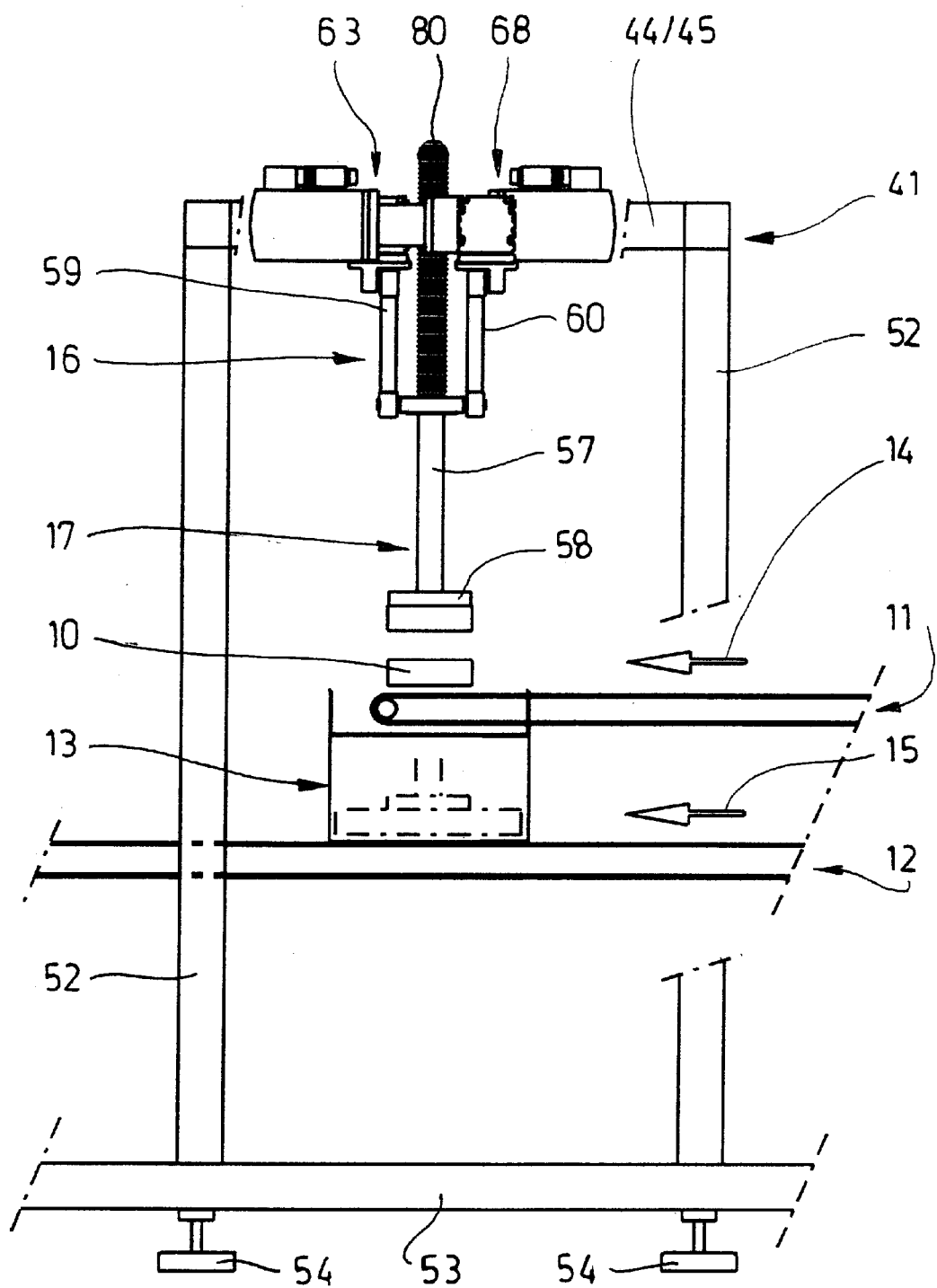
FIG. 8 shows a side view of the apparatus according to FIGS. 6 and 7.
Figure 9:
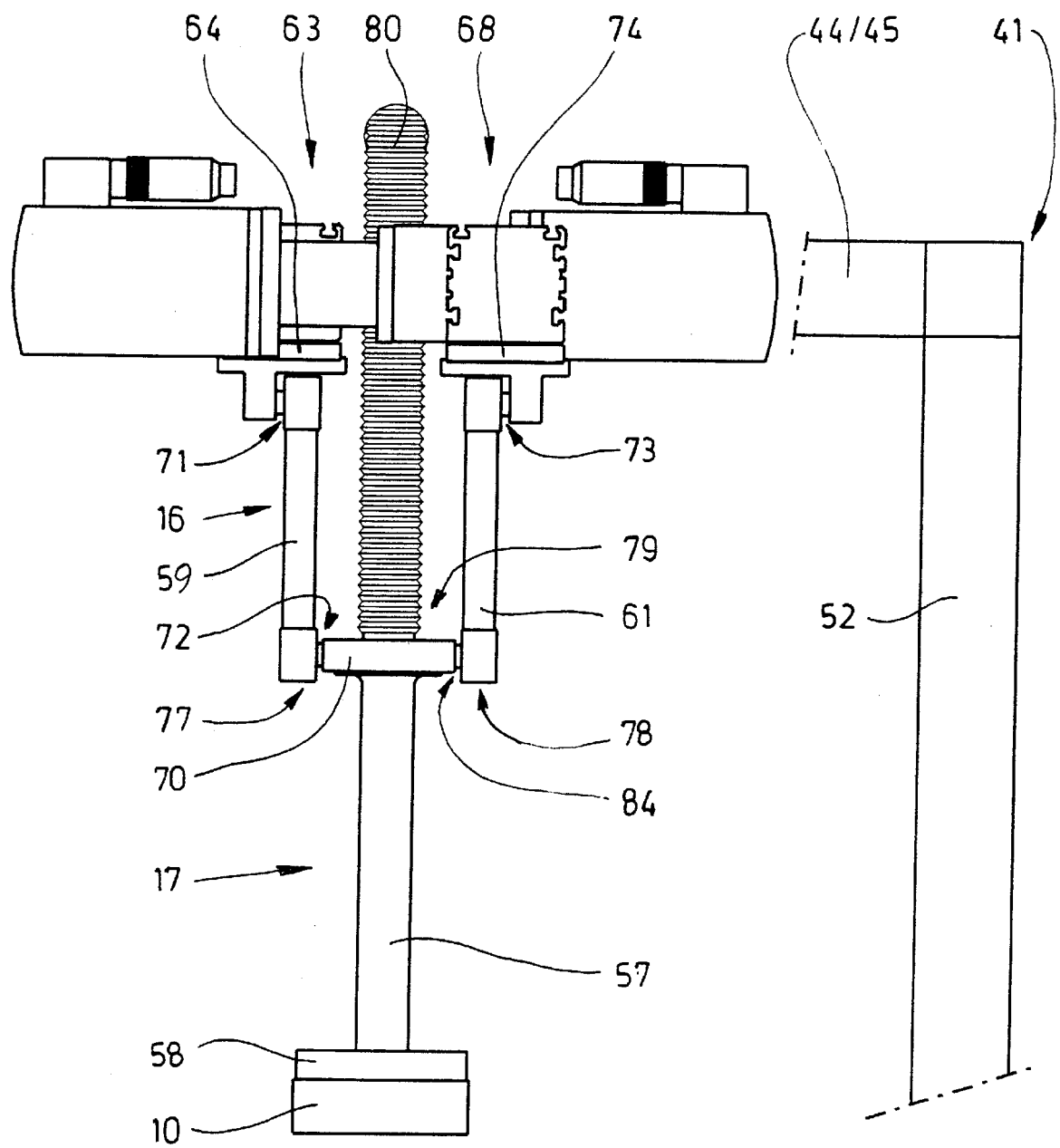
FIG. 9 shows, in a view analogous to FIG. 8, a detail of the apparatus according to FIGS. 6 to 8 in the region of linear drives.

According to FIG. 3, the linear drives 25, 30 are arranged, above the feed conveyor 11 and removal conveyor 12, on a common, closed frame 41. The frame 41 comprises two elongate crossmembers 42, 43, which run transversely to the conveying direction of the feed conveyor 11 and removal conveyor 12, and two members 44, 45 which connect the crossmembers 42, 43. The linear drives 25, 30 are each mounted on the members 44, 45 by way of one end 46, 47 and, just like the crossmembers 42, 43, run transversely to the conveying direction of the feed conveyor 11 and removal conveyor 12. The direction of movement of the linear drives 25, 30, which runs transversely to the conveyor direction of the feed conveyor 11 and removal conveyor 12, is illustrated by a double arrow 85 in FIG. 2. For reasons of stability, drive motors 48, 49 of the linear drives 25, 30, said drive motors being designed as servomotors, are positioned in the immediate vicinity of the members 44, 45 of the frame 41.

The frame 41 rests on vertical supports 50, 51, 52. In each case two supports 50 are arranged between the feed conveyor 11 and removal conveyor 12, that is to say positioned alongside adjacent sides of the feed conveyor 11 and removal conveyor 12. The two supports 51 and 52 are arranged in each case on the respectively other sides of the feed conveyor 11 and removal conveyor 12. Accordingly, the feed conveyor 11 is bounded laterally by the supports 51, 50 and mounted thereon. The removal conveyor 12 is bounded laterally by the supports 50, 52 and likewise mounted thereon The feed conveyor 11 terminates in the region of the linear drives 25, 30. In contrast, the removal conveyor 12 runs throughout the entire region of the apparatus according to the invention. In a bottom region, the supports 50, 51, 52, in order to be stabilized, are connected by members 53. The carrying structure, formed by the frame 41 and the supports 50, 51, 52, for the linear drives 25, 30, on the one hand, and for the extension arm 16 and the receiving head 17, which is arranged thereon, on the other hand, rests on a floor, for example of a machine room, by way of feet 54.

The frame 41 projects beyond the supports 50, 51, 52 by way of lateral ends 55, 56. This ensures that, despite a small construction, the receiving head 17 can be displaced optimally in space.

The receiving head 17, for receiving the articles 10, is preferably designed as a suction element and has two functionally separate regions, namely a shank 57 and a suction region 58. The shank 57 connects the suction region 58 to the plate 28 and serves for receiving supply lines for the suction region 58, namely electric and/or pneumatic lines (not shown). The adjoining suction region 58 has one or more suction chambers, which can be subjected to negative pressure and grasp articles 10 as a result of the negative pressure. The shank 57 may preferably be designed as a telescopic element. In this case, it is possible to set the length of the shank 57 by retraction and extension. Furthermore, it is conceivable for the receiving head 17, in particular the suction region 58, to be of rotatable design. In this case, an axis of rotation would preferably coincide with a longitudinal centre axis of the shank 57.

The second exemplary embodiment, according to FIGS. 6 to 9, corresponds to the exemplary embodiment according to FIGS. 1 to 5, inter alia, in terms of the configuration and arrangement of the feed conveyor 11, removal conveyor 12, receiving head 17, frame 41 and supports 50, 52. The same designations are thus used for the same subassemblies. In order to avoid repetition. as far as the design details of these subassemblies are concerned, you are thus referred to what has been said above. There are differences in terms of the configuration and arrangement of the extension arm and of the linear drives. In this respect:

The extension arm 16 of the exemplary embodiment according to FIGS. 6 to 9 likewise comprises a plurality of levers, namely three levers 59, 60, 61. Two levers 59, 60 run parallel to one another and are connected in an articulated manner to a linear drive 63, namely a carriage 64 of the same, at one end 62. By way of the ends 65, which are located opposite the ends 62, the levers 59, 60 are connected via a plate 66, on the one hand, in an articulated manner to one another and, on the other hand, to the receiving head 17. The further lever 61 is arranged at an angle to the parallel levers 59, 60 and is connected in an articulated manner to a second, independently controllable linear drive 68 by way of one end 67. By way of an end 69, which is located opposite the end 67, the lever 61 is mounted on the plate 66, to be precise on a side 70 of the plate 66, on which the lever 59 of the parallel levers 59, 60 likewise acts. In this respect, the extension arm 16 of the exemplary embodiment according to FIGS. 6 to 9 has one lever fewer than the extension arm of the exemplary embodiment according to FIGS. 1 to 5 and, accordingly, also has a smaller number of articulations.

Specifically, the extension arm 16 of the exemplary embodiment according to FIGS. 6 to 9 has six articulations, namely two articulations 71 in the region of the carriage 64 of the linear drive 63, two articulations 72 in the region of the plate 66 and two articulations 73, 84 assigned to the ends 67, 69 of the lever 61, it being the case that the articulation 84, in turn, is assigned to the plate 66.

The articulations 71, 73, which are assigned to the linear drives 63, 68, are again, in accordance with the exemplary embodiment according to FIGS. 1 to 5, arranged in one plane. The same applies to the articulations 72, 84, which are assigned to the receiving head 17 and the ends 65, 69 of the levers 59, 60, 61. Also of importance is the fact that it is also the case with the extension arm 16 of the exemplary embodiment according to FIGS. 6 to 9 that the articulations 72, 84 are arranged symmetrically in relation to the longitudinal centre axis of the receiving head 17. In this case, the articulations 72 of the parallel levers 59, 60 are arranged at the same spacings in relation to the longitudinal centre axis of the receiving head 17. Furthermore, the articulation 72 of the lever 59 and the articulation 84 of the lever 61 are arranged such that the two articulations 72, 84 are at the same spacings in relation to the longitudinal centre axis of the receiving head 17. For this purpose, the articulations 72, 84 of the levers 59, 61 are assigned to the mutually opposite ends of the side 70 of the plate 66. The symmetrical arrangement of the articulations 72, 84 of the levers 59, 60, 61, in turn, achieves the situation where the receiving head 17 is subjected to force exclusively in the direction of its longitudinal centre axis.

The parallel levers 59, 60 of the extension arm 16, once again, form a parallelogram linkage. Accordingly, if the spacing of the linear drives 63, 68 relative to one another is changed, the parallel levers 59, 60 are pivoted in relation to one another such that the distance between the levers 59, 60 changes. This ensures that the receiving head 17 is designed such that it can be moved, on the one hand, back and forth in the horizontal direction and, on the other hand, up and down in the vertical direction.

In contrast to the exemplary embodiment according to FIGS. 1 to 5, the linear drives 63, 68, in the case of the exemplary embodiment according to FIGS. 6 to 9, are arranged one beside the other rather than one above the other. Accordingly, the linear drives 63, 68 run in one horizontal plane. The carriages 64, 74 of the linear drives 63, 68 are thus both provided on undersides 75, 76 of the linear drives 63, 68.

In contrast to the exemplary embodiment according to FIGS. 1 to 5, the exemplary embodiment according to FIGS. 6 to 9 has the advantage that the levers 59, 61 of the extension arm 16 act on the plate 66 merely at ends 77, 78 of the side 70, of the same, but a central region 79 of the plate remains free. In this case, the central region 79 serves for the connection of a flexible tube 80, with the aid of which electric supply lines and/or pneumatic supply lines can be routed into the region of the receiving head 17 and/or of the shank 57.

As far as the rest of the design details of the apparatus according to the second exemplary embodiment of the invention are concerned, you are referred to what has been said in relation to the exemplary embodiment according to FIGS. 1 to 5.

List of Designations

| | | | |
|---|---|---|---|
| 10 | Article | 49 | Drive motor |
| 11 | Feed conveyor | 50 | Support |
| 12 | Removal conveyor | 51 | Support |
| 13 | Pack | 52 | Support |
| 14 | Arrow | 53 | Member |
| 15 | Arrow | 54 | Foot |
| 16 | Extension arm | 55 | End |
| 17 | Receiving head | 56 | End |
| 18 | Lever | 57 | Shank |
| 19 | Lever | 58 | Suction region |
| 20 | Lever | 59 | Lever |
| 21 | Lever | 60 | Lever |
| 22 | Pair | 61 | Lever |
| 23 | Pair | 62 | End |
| 24 | End | 63 | Linear drive |
| 25 | Linear drive | 64 | Carriage |
| 26 | Carriage | 65 | End |
| 27 | End | 66 | Plate |
| 28 | Plate | 67 | End |
| 29 | End | 68 | Linear drive |
| 30 | Linear drive | 69 | End |
| 31 | Carriage | 70 | Side |
| 32 | End | 71 | Articuiation |
| 33 | Side | 72 | Articulation |
| 34 | Articulation | 73 | Articulation |
| 35 | Articuiation | 74 | Carriage |
| 36 | Articuiation | 75 | Underside |
| 37 | Articuiation | 76 | Underside |
| 38 | Underside | 77 | End |
| 39 | Top side | 76 | End |
| 40 | Carrying element | 79 | Region |
| 41 | Frame | 80 | Tube |
| 42 | Crossmember | 81 | Base leg |
| 43 | Crossmember | 82 | Leg |
| 44 | Member | 83 | Leg |
| 45 | Member | 84 | Articulation |
| 46 | End | 85 | Double arrow |
| 47 | End | | |
| 48 | Drive motor | | |

What is claimed is:

1. Apparatus for handling articles in conjunction with the packaging of said articles, said apparatus comprising:

a coupling link for carrying a receiving head for holding at least one of said articles;

an extension arm including two parallel levers and at least one further lever arranged at an angle to said parallel levers, wherein said parallel levers and said further lever are each directly connected in an articulated manner to said coupling link;

a first carriage having said parallel levers connected thereto in an articulated manner and a second carriage having said further lever connected thereto in an articulated manner, wherein said carriages are disposed above said receiving head; and a first linear drive for moving said first carriage substantially horizontally and a second linear drive for moving said second carriage substantially horizontally to move at least one said article from a substantially horizontal supply plane to a substantially horizontal receiving plane, wherein said first and second carriages are movable independently such that each said carriage can be moved without moving the other said carriage.

2. Apparatus as in claim 1, wherein:

said parallel levers include a first parallel lever pivotally connected to said coupling link at a first location and a second parallel lever pivotally connected to said coupling link at a second location spaced horizontally from and in the same horizontal linking plane as said first location; and said further lever is pivotally linked to said coupling link in said linking plane at a location proximate to said second location.

3. Apparatus as in claim 2, wherein:

said first and second parallel levers are pivotally linked to said first carriage at horizontally spaced locations in the same horizontal carriage plane;

said further lever is pivotally linked to said second carriage at a location in said carriage plane.

4. Apparatus as in claim 1, comprising two said further levers.

5. Apparatus as in claim 2, wherein:

said parallel levers include a first parallel lever pivotally connected to said coupling link at a first location and a second parallel lever pivotally connected to said coupling link at a second location spaced horizontally from and in the same horizontal linking plane as said first location; and said further levers are pivotally linked to said coupling link in said linking plane at a location proximate to said second location.

6. Apparatus as in claim 1, wherein:

said first and second linear drives include first and second horizontal drive rails, respectively, said drive rails being disposed side-by-side and being movable relative to each other in their longitudinal direction and said first and second carriages depend from said first and second drive rails, respectively.

7. Apparatus in claim 1, wherein:

said first and second linear drives include first and second horizontal drive rails, respectively, said second drive rail being disposed on top of said first drive rail and said drive rails being movable relative to each other in their longitudinal directions; and said first carriage is attached to a bottom side of said first drive rail and said second carriage is attached to a top side of said second drive rail and includes an extension arm attached to said further lever.

8. Apparatus as in claim 1, further comprising a closed frame mounting said first and second linear drives above a feed conveyor for supplying said articles and a removal conveyor along side the feed conveyor, wherein said first and second carriages are movable transverse to conveying directions of said feed conveyor and said removal conveyor.

9. Apparatus as in claim 8, wherein said frame is mounted on vertical supports disposed along side said feed conveyor and said removal conveyor and said frame projects laterally beyond said supports.

10. Apparatus as in claim 8, wherein movement of said carriages transfers the articles from a feed conveyor for supplying the articles to a location under said apparatus to a removal conveyor for moving the articles from such location after placement in a package, said feed conveyor and said removal conveyor being disposed side-by-side with parallel conveying directions and with said supply conveyor at a level above said feed conveyor.

* * * * *